Dec. 26, 1922. 1,439,774

A. R. WERT.
TIRE REPAIR TOOL.
FILED APR. 6, 1921.

Albert R. Wert, *Inventor*

By Lancaster and Allwine, *Attorneys*

Patented Dec. 26, 1922.

1,439,774

UNITED STATES PATENT OFFICE.

ALBERT R. WERT, OF NORTH YAKIMA, WASHINGTON.

TIRE-REPAIR TOOL.

Application filed April 6, 1921. Serial No. 459,170.

*To all whom it may concern:*

Be it known that I, ALBERT R. WERT, a citizen of the United States, residing at North Yakima, in the county of Yakima and State of Washington, have invented certain new and useful Improvements in Tire-Repair Tools, of which the following is a specification.

This invention relates to tools of the type utilized in automobile tire repairing, and the primary object of the invention is to provide an improved knife for making sectional repairs to tire casings or reliners for old tires, which is so constructed that only one ply of the fabric of the tire casing can be cut at one time, thereby preventing the accidental cutting of other plies of the fabric and the consequent weakening of the tire carcass.

Another object of the invention is to provide an improved tire casing embodying a blade and a novel guard for the blade, so as to prevent the too deep cutting of the blade in the carcass, the guard having a novel means for holding the blade in any preferred adjusted position against accidental movement, the adjustment permitting the ready sharpening of the blade when so desired or necessary.

A further object of the invention is to provide an improved tire repair tool of the above character, which will be durable and efficient in use, one that will be easy and simple to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, and in which drawings:

Referring to the drawings in detail, wherein similar reference characters designate corresponding parts throughout the several views, the letter A indicates the handle; B, the knife blade; and C, the guard arranged in the handle for receiving the knife blade.

Figure 1:
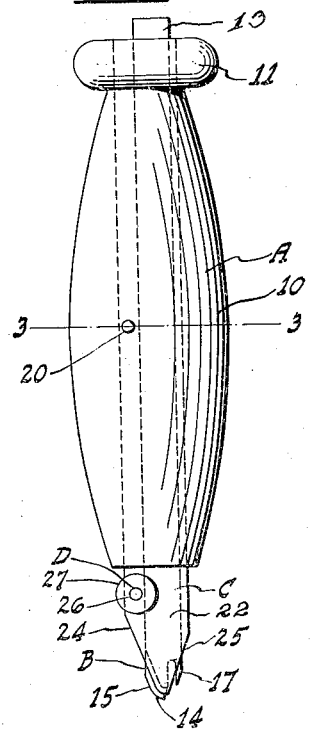
Figure 1 is a side elevation of the improved tire repairing knife.
Figure 2:
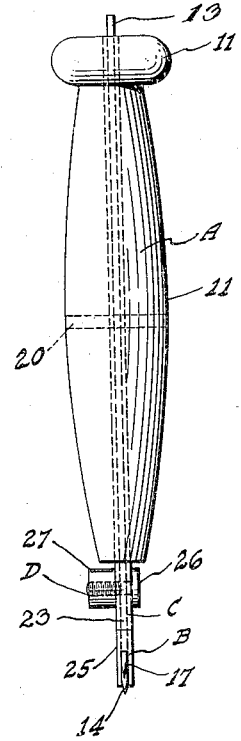
Figure 2 is a rear elevation of the same.

The handle A is formed of any preferred material, such as wood or the like, and is gradually enlarged toward the central portion thereof as at 10 so as to permit a firm grip to be had thereon by the hand of the user. The upper end of the handle is provided with the outstanding bead 11 which prevents the slipping of the hand of the user from off of the handle. The handle is provided with a longitudinally extending way 12, which runs completely through the handle. This way 12 is of polygonal formation, for receiving the guard or holder C of the blade B.

The blade B is formed of steel or the like and includes the longitudinally extending body 13, which is adapted to extend entirely through the way 12 and the lower end of the body is provided with the cutting portion as will be now described. The lower end of the body 13 is provided with the cutting edge 14 which is adapted to protrude below the holder or guard C, and this cutting edge extends up the forward longitudinal edge of the body 13 as at 15 for a short distance. It can be seen that this cutting edge is at an incline to the vertical. Directly in rear of the lower cutting edge 14 the body 13 is provided with an inwardly extending slot 16 defining the tongue 17, which has its inner edge sharpened as at 18, the lower edge of the tongue 17 being inclined as at 19 to provide a penetrating point, the purpose of which will be hereinafter more fully described.

The guard or holder C for the blade B is also preferably formed of metal and extends entirely through the handle and is held positioned against accidental displacement by means of the transversely extending rivet or pin 20.

Figure 3:
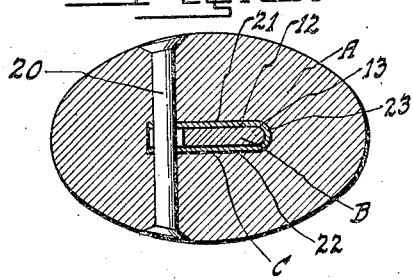
Figure 3 is a detail transverse section through the improved knife, taken on the line 3—3 of Figure 1.
Figure 4:
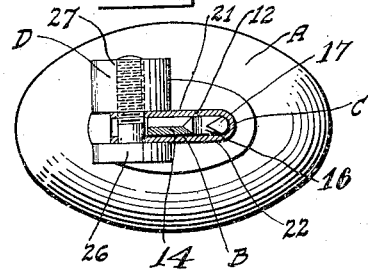
Figure 4 is a bottom plan view of the improved knife, showing the guard for the knife blade in section.
Figure 5:
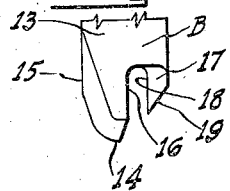
Figure 5 is an enlarged fragmentary elevation of the knife blade.

The holder C is of substantially the same cross sectional configuration as the way 12, so as to snugly fit in the same. This prevents any movement of the holder or guard C within the way. Owing to the fact that the guard or holder C is formed of metal, there is a certain inherent resiliency therein, which is utilized for holding the blade B in position, as will be hereinafter more fully described. The holder or guard C is substantially U-shaped in cross section and includes the side wings 21 and 22 and the connecting bight portion 23. The blade B is narrower than the holder C as clearly shown in Figures 1, 3, and 4 of the drawings, and it can be seen that the wings 21 and 22 extend beyond the forward longitudinal edge of the body 13 of the blade B. The forward edge of the holder C adjacent to its lower end is inclined upwardly and forwardly as at 24, while the rear edge is inclined upwardly and rearwardly as at 25. This conforms to the lower configuration of the blade B and the blade B is adapted to be positioned in relation to the holder that the cutting edges thereof will extend slightly beyond the lower edge of the holder.

In order to hold the blade in position against accidental displacement, the locking means D is provided. This locking means D includes a screw 26, which is positioned through the wings 21 and 22 adjacent to the free longitudinal edges thereof, and a nut 27 is threaded on the screw which is adapted to be adjusted into tight engagement with the outer surface of one of the wings 21 and 22, so as to force the wings 21 and 22 into friction tight engagement with the blade B.

In use of the improved knife, the nut 27 is loosened and the blade adjusted, so as to permit the lower end thereof just to protrude beyond the guard a sufficient distance for cutting one ply of the fabric of the carcass of the tire, after which the nut is again tightened, so that the blade will be held in position against displacement. The handle A is then firmly grasped by the hand of the user and the cutting edge 14 is inserted in the tire and moved along, so as to cut the fabric around the place where the tire is to be repaired.

If so desired the tongue 17 can be utilized for cutting the fabric instead of the point 14, and in this instance, the tongue 17 is inserted in the tire and under the tire fabric which is to be cut and the handle A is held at an incline. The inclined edge 25 of the guard is then held in engagement with the tire and the tool is pushed along the place where the fabric is to be cut. When it is desired to sharpen the blade, the same can be entirely removed from the holder or guard, or simply pulled out or adjusted a sufficient distance to expose the edges thereof which are to be sharpened.

From the foregoing description it can be seen that a novel tool has been provided of exceptionally simple and durable construction, which will permit the easy repairing of a tire, and which will insure of the cutting of only one ply of fabric at a time.

Changes in details may be made without departing from the spirit or scope of this invention; but,

I claim:

1. A knife comprising a handle having a longitudinally extending way therein, a holder U-shaped in cross section fitted in said way, means securing the holder to the handle, a knife blade arranged in said holder having one end thereof sharpened and arranged to protrude beyond the holder a predetermined distance, and means for urging the sides of the U-shaped holder into frictional engagement with the blade.

2. A knife comprising a handle having a longitudinally extending way therein, a sheet metal holder arranged in said way including a pair of longitudinally extending side walls and a connecting wall, a knife blade slidably mounted in said holder, one end of said blade being sharpened and arranged to protrude beyond the holder a predetermined distance, and means carried by the side walls of the holder adjacent to the free edges thereof for moving the side walls into friction tight engagement with said blades.

3. A tire repair tool comprising a handle having a longitudinally extending way therein, a sheet metal holder arranged in said way substantially U-shaped in cross section including side walls and a connecting wall, a knife blade slidably mounted in said holder, one end of said holder having its opposite sides inclined in opposite directions, one end of said blade having its opposite ends inclined in opposite directions to conform to the inclined end of the holder, said end of the blade being sharpened, and a cutting tongue formed on said blade and arranged to extend beyond the inclined side of the end of said holder.

4. In a tire repair tool, a knife blade including a longitudinally extending body, one end of the body having its opposite sides inclined and provided with cutting edges, said end being provided with an inwardly extending notch defining a tongue, the inner end of said tongue being sharpened.

ALBERT R. WERT.